United States Patent
Buelow

(12) 
(10) Patent No.: US 6,306,472 B1
(45) Date of Patent: *Oct. 23, 2001

(54) EVA-EVOH DELAMINATION SEAL

(75) Inventor: Duane H. Buelow, Neenah, WI (US)

(73) Assignee: Pechiney Emballage Flexible Europe (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,273

(22) Filed: Apr. 22, 1998

(51) Int. Cl.[7] .................. B29D 22/00; B32B 23/02; B32B 3/00; B32B 7/12; B32B 27/08

(52) U.S. Cl. ............. 428/35.2; 428/35.7; 428/36.7; 428/192; 428/194; 428/200; 428/347; 428/518; 428/519; 383/116; 383/211

(58) Field of Search ............ 428/35.2, 35.7, 428/36.7, 57, 58, 192, 194, 200, 347, 518, 519; 383/109, 113, 116, 210, 211

(56) References Cited

U.S. PATENT DOCUMENTS

| | | | |
|---|---|---|---|
| 4,421,823 | 12/1983 | Theisen et al. | 428/349 |
| 4,712,990 | 12/1987 | Kudert et al. | 425/130 |
| 4,759,984 | * 7/1988 | Hwo | 428/349 |
| 4,782,951 | 11/1988 | Griesbach et al. | 206/484 |
| 4,784,885 | 11/1988 | Carespodi | 428/36.8 |
| 4,944,409 | 7/1990 | Busche et al. | 206/632 |
| 5,098,794 | * 3/1992 | Schaefer | 428/457 |
| 5,374,459 | * 12/1994 | Mumpower et al. | 428/36.7 |
| 5,382,470 | * 1/1995 | Vicik | 428/334 |
| 5,763,095 | * 6/1998 | Ramesh et al. | 428/474.4 |
| 5,882,749 | * 3/1999 | Jones et al. | 428/35.2 |

OTHER PUBLICATIONS

Hwo, Charles C., Polybutylene Blends as Easy Open Seal Coats for Flexible Packaging and Lidding, Journal of Plastic Film & Sheeting, vol. 3, pp. 245–259 (Oct., 1987).

U.S. application No. 08/682,413, filed Jul. 17, 1996 as Statutory Invention Disclosure.

* cited by examiner

Primary Examiner—Rena L. Dye
Assistant Examiner—Michael C. Miggins
(74) Attorney, Agent, or Firm—McDermott, Will & Emery

(57) ABSTRACT

Multilayer films and packaging structures having a delamination seal and an oxygen barrier layer are disclosed. The delamination structure adjacent to the EVOH oxygen barrier layer binds well to the EVOH layer and also retains its ability to delaminate. The multilayer films, and packages in which they are utilized, have several layers including a first, external layer; a second, tie layer comprising a mixture of polybutylene and an anhydride modified polyethylene such that a peelable bond is formed between said first, external layer and said second, tie layer; a third, core layer comprising ethylene vinyl alcohol which functions as an oxygen barrier layer; a fourth, tie layer comprising an anhydride modified polyethylene and a fifth, external layer.

29 Claims, 3 Drawing Sheets

EVA-EVOH DELAMINATION SEAL

FIELD OF THE INVENTION

The present invention relates generally to the packaging industry. More particularly, the invention relates to multi-layer films and packages which incorporate a delamination seal feature and also have oxygen barrier properties.

BACKGROUND OF THE INVENTION

In many commercial packaging applications it is desirable to provide multilayer packaging materials in order to produce a package having multiple attributes. For instance, in the food packaging area, it is especially desirable to make consumer packages which are readily opened by digital pull-apart force. Delamination seals are particularly useful for this purpose. These seals include two or more layers and in which delamination occurs between two of the layers. Such a delamination system works on the principal that a bond is formed between structural package layers and one of the layers making up the delamination structure which has a greater bond strength than the peelable bond between the two film layers which delaminate from each other with manual force. Choice of materials determines which layers will delaminate from each other.

It is also important to place perishable foods such as meats and cheeses into packages which allow for the preservation of these foods for as long as possible. Maximizing the time in which the food remains preserved, especially between initial packaging and arrival at the retail store is especially important. Atmospheric oxygen is a common culprit in promoting food spoilage. Oxygen is reduced to a variety of free radical species which oxidize carbon-carbon double bonds in food and other perishable products. Such oxidation by free radicals adversely affects the odor and flavor of certain foods and can affect the stability of non-food products. Thus, it is desirable to incorporate oxygen barrier film layers into packaging materials. A particularly effective oxygen barrier material is ethylene vinyl alcohol (EVOH).

Providing packages having multiple attributes such as an easy opening delamination seal and oxygen barrier properties frequently necessitates bonding multiple layers of film having different properties together. Unfortunately, many film materials are not compatible with and thus, do not adequately seal to other packaging materials. It has been especially difficult to directly seal oxygen barrier film layers containing EVOH to film layers typically used in delamination seal technology. One approach to the problem is to interpose extra layers in between the EVOH layer and the layers making up the delamination seal. However, this approach does not always prove expedient or convenient.

A need therefore exists for a multilayer packaging material having an oxygen barrier layer as well as delamination layers. Furthermore, it is desirable to achieve this structure with a minimal number of film layers. It is therefore necessary to find film layer materials which bind together well and also retain their independent attributes of ease of delamination and oxygen barrier properties.

SUMMARY OF THE INVENTION

The present invention is directed to multilayer films and packaging structures having a delamination seal and an oxygen barrier layer. The delamination structure adjacent to the EVOH oxygen barrier layer binds well to the EVOH layer and also retains its ability to delaminate.

In one embodiment, the invention provides an easy open package adapted to be heat sealed closed in order to contain a product within the package. The package is easily opened by manual force. The package includes a first package wall having a multilayer film construction. The multilayer film construction includes the following layers: a first, external layer; a second, tie layer comprising a blend of an anhydride modified polyethylene and one or a mixture of polybutylene, polypropylene or a styrene-butadiene copolymer so that a peelable bond is formed between the first, external layer and the second, tie layer; a third, core layer comprising ethylene vinyl alcohol; a fourth, tie layer comprising an anhydride modified polyethylene; and a fifth, external layer. The package also includes a second package wall joined at a portion of its perimeter to the first package wall. The first, external layer of the first package wall is heat sealed to the second package wall to create a sealed pouch or package, The bond formed between the first, external layer of the first package wall and the second package wall has a greater bond strength compared to the peelable bond so that upon application of manual force, the first and second package walls will remain bonded together and delamination will occur between the peelably bonded layers.

In a preferred embodiment, the first package wall has a multilayer film construction specifically including the following layers: a first, external layer comprising an ethylene vinyl acetate copolymer; a second, tie layer comprising a blend of an anhydride modified polyethylene and a compound selected from the group consisting of polybutylene, polypropylene and a styrene-butadiene copolymer such that a peelable bond is formed between the first, external layer and said second, tie layer; a third, core layer comprising ethylene vinyl alcohol; a fourth, tie layer comprising an anhydride modified polyethylene and a fifth, external layer comprising an ethylene vinyl acetate copolymer. The package also includes a second package wall joined at a portion of its perimeter to the first package wall. The first, external layer of the first package wall is heat sealed to the second package wall to create a sealed pouch or package. The bond formed between the first, external layer of the first package wall and the second package wall has a greater bond strength compared to the peelable bond so that upon application of manual force, the first and second package walls will remain bonded together and delamination will occur between the peelably bonded layers.

In yet another preferred embodiment, the second package wall comprises a polymer which is identical to or, at least, heat seal compatible to, the first package wall.

In an especially preferred embodiment, the second, tie layer of the first package wall comprises approximately ten to thirty-five percent polybutylene by weight and between about sixty-five to ninety percent of an anhydride modified polyethylene by weight.

In a second embodiment, the present invention provides a multilayer film construction which includes the following layers: a first, external layer; a second, tie layer comprising a blend of an anhydride modified polyethylene and a compound selected from the group consisting of polybutylene, and a styrene-butadiene copolymer so that a peelable bond is formed between the first, external layer and the second, tie layer; a third, core layer comprising ethylene vinyl alcohol; a fourth, tie layer comprising an anhydride modified polyethylene and a fifth, external layer.

In a preferred embodiment, the multilayer film construction specifically includes the following layers: a first, external layer comprising an ethylene vinyl acetate copolymer; a second, tie layer comprising a blend of an anhydride modified polyethylene and a compound selected from the group consisting of polybutylene, polypropylene and a styrene-butadiene copolymer such that a peelable bond is formed between the first, external layer and said second, tie layer; a third, core layer comprising ethylene vinyl alcohol; a fourth, tie layer comprising an anhydride modified polyethylene and a fifth, external layer comprising an ethylene vinyl acetate copolymer.

In an especially preferred embodiment, the second, tie layer of the multilayer film construction comprises approximately ten to thirty-five percent polybutylene by weight and between about seventy to ninety percent of an anhydride modified polyethylene by weight.

BRIEF DESCRIPTION OF THE DRAWINGS

Other objects and advantages of the invention will become apparent upon reading the following detailed description and upon reference to the drawings in which.

While the invention will be described in connection with certain preferred embodiments, it is not intended to limit the invention to the specific exemplary embodiments. On the contrary, it is intended to cover all alternatives, modifications, and equivalents as may be included within the spirit and scope of the invention as defined by the appended claims.

DESCRIPTION OF THE PREFERRED EMBODIMENTS

Figure 1:
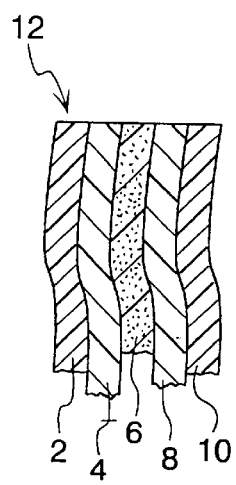
FIG. 1 is a side sectional view of the multilayer film of the instant invention.
Figure 2:
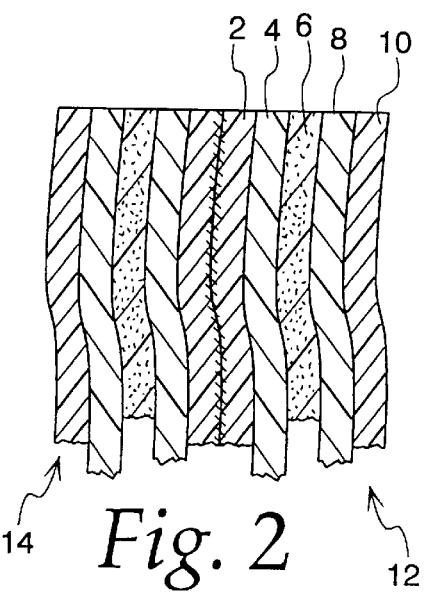
FIG. 2 is a side sectional view of the multilayer film shown in FIG. 1 heat sealed to an opposing package film.

Turning now to the drawings, FIG. 1 depicts the multilayer film 12 of the instant invention. The multilayer film 12 is composed of five distinct layers of resins and/or resin combinations. The inside, or first external layer 2 is preferably made of an ethylene vinyl acetate (EVA) resin. Slip/antiblock additives may be added to improve the surface characteristics of various film layers. An example of an antiblock additive is silica. An example of a slip additive is erucamide, a fatty acid amide. Other suitable resins for the first, external layer 2 include an ethylene vinyl acetate copolymer, linear low density polyethylene, an ethylene ethyl acrylate copolymer, an ethylene methyl acrylate copolymer, a neutralized ethylene acid copolymer, and low density polyethylene and certain mixtures and blends of these resins. As shown in FIG. 2, it is this first, external layer 2 which is heat sealed to a second package film 14 to form a package. Most preferably, the second package film is a single layer film which is heat seal compatible to the portion of the first package wall to which it is heat sealed. Most preferably, these two heat sealable surfaces are made of identical materials. The heat seal area is indicated by cross-hatching.

The first external layer 2 is a thin layer, preferably measuring only approximately ten percent of the total thickness of the multilayer film 12 of the instant invention. The second, tie layer 4 is the layer containing the resin combinations giving this film structure the ability to perform as a delamination peelable sealant. Specifically, the second, tie layer 4 is comprised of a combination of an anhydride modified polyethylene and polybutylene, polypropylene and/or styrene-butadiene copolymer resins. Most preferably, the anhydride modified polyethylene component of the tie layer 4 is made of a combination of Bynel® resins from E.I. DuPont De Nemours & Company, Wilmington, Del. Specifically, it is most preferable to utilize a blend of a Bynel® resin which is an anhydride modified linear low density polyethylene (LLDPE) with a Bynel® resin which an anhydride modified low density polyethylene (LDPE) and combine this blend with polybutylene. This combination of Bynel® adhesives and polybutylene allows the first, external layer 2 and the second, tie layer 4 to separate while maintaining adhesion between the second, tie layer 4 and the third oxygen barrier layer 6. The second, tie layer 4 preferably comprises between about ten to thirty-five percent polybutylene by weight and between about sixty-five to ninety percent of Bynel® resins by weight. Most preferably, the second, tie layer 4 is made up of approximately 20% polybutylene by weight and about 80% of Bynel® resins by weight. The second, tie layer 4 measures approximately fifteen percent of the total thickness of the multilayer film 12.

The center core layer 6 contains an ethylene vinyl alcohol (EVOH) barrier resin. This layer is primarily responsible for the oxygen barrier properties of the multilayer film of the instant invention. This core layer 6 measures approximately ten percent of the total thickness of the multilayer film 12.

The fourth, tie layer 8 is comprised of an anhydride modified polyethylene such as Bynel® or a combination of Bynel® resins and an ethylene vinyl acetate (EVA) resin. This fourth, tie layer 8 measures approximately thirty-five percent of the total thickness of the multilayer film 12.

The fifth, external layer 10 comprises EVA, preferably having a low vinyl acetate content. Other suitable resins for the fifth layer include an ethylene vinyl acetate copolymer, linear low density polyethylene, an ethylene ethyl acrylate copolymer, an ethylene methyl acrylate copolymer, a neutralized ethylene acid copolymer, and low density polyethylene and certain mixtures and blends of these resins. This fifth, external layer 10 is the side of the multilayer film that may be laminated to other layers including forming webs and non-forming webs, both printed and unprinted. This fifth, external layer 10 measures approximately thirty percent of the total thickness of the multilayer film 12. The total thickness of the multi-layer film is approximately 2.0 mils.

Provided below is a simple illustration of the preferred five layer multilayer film of the instant invention:

| 5-Layer EVA-EVOH Delamination Structure: | | | | |
| --- | --- | --- | --- | --- |
| EVA + Slip/AB Inside | Bynel Adhesive Resin + Polybutylene Resin Peelable Tie | EVOH Resin Core | Adhesive Tie Outside Tie | EVA Resin Outside |
| Layer 1 | Layer 2 | Layer 3 | Layer 4 | Layer 5 |

FIG. 2 shows the multilayer film 12 shown in FIG. 1 heat sealed to an opposing package film 14. In order to insure adequate heat sealing between the two multilayer packaging films, 12 and 14, the first, external layer 2 of the first multilayer package film 12 should be of the same or a similar composition to the second packaging film 14. Films with similar properties heat seal best to each other. If the second packaging film 14 is a multilayered film, the layer which contacts the first external layer of the first multilayered film 12 should be of the same or a similar composition. Thus, if the first, external layer 2 of the first multilayer package film 12 is made up of EVA, the second package film 14 or if multilayered, the layer of package film 14 which is heat sealed to the first multilayer film 12, should also be made of EVA or a composition with properties similar to that of EVA.

Figure 3:
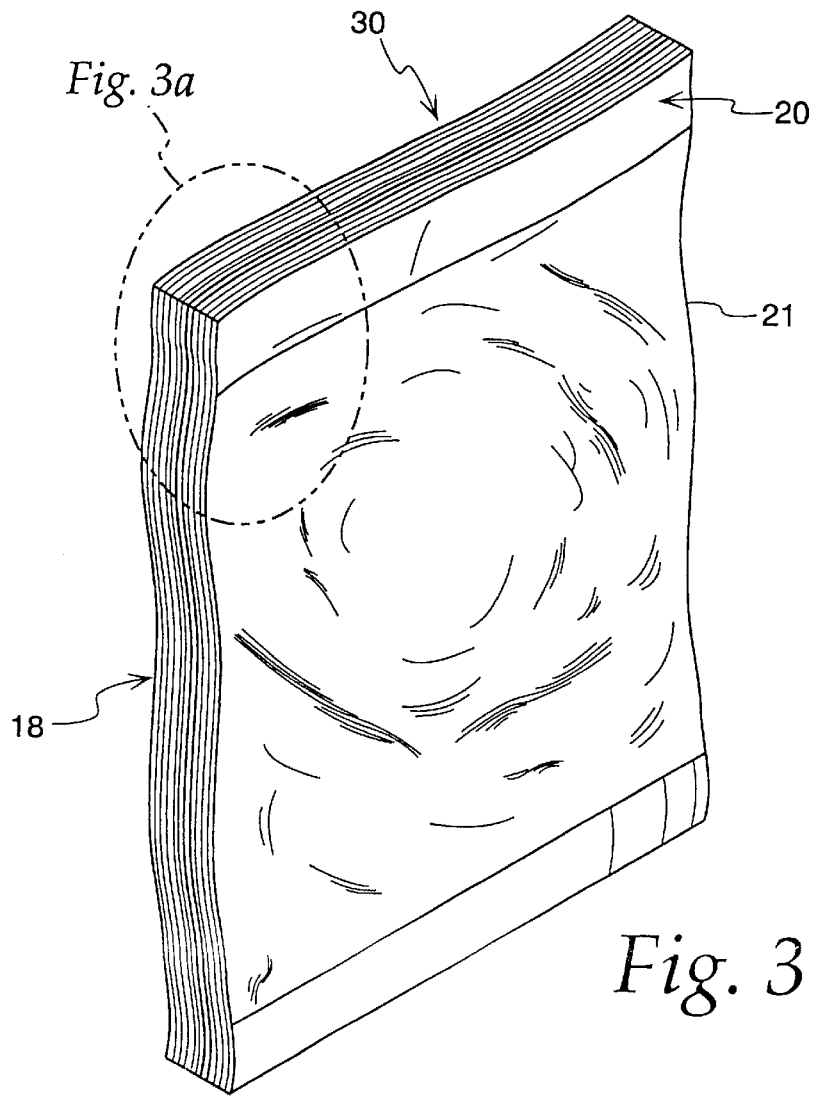
FIG. 3 is a view of a closed, heat sealed package which incorporates the multilayer film of the instant invention.

FIG. 3 shows a package 18 having first and second package walls 20, 30 having multilayer film construction. The first package wall 20 is joined at a portion of its perimeter 21 to the second package wall 30. Again, the two package walls need not be identical as long as the film layer of one package wall that is to be heat sealed to the film layer of the second package wall are heat seat compatible.

Figure 3A:
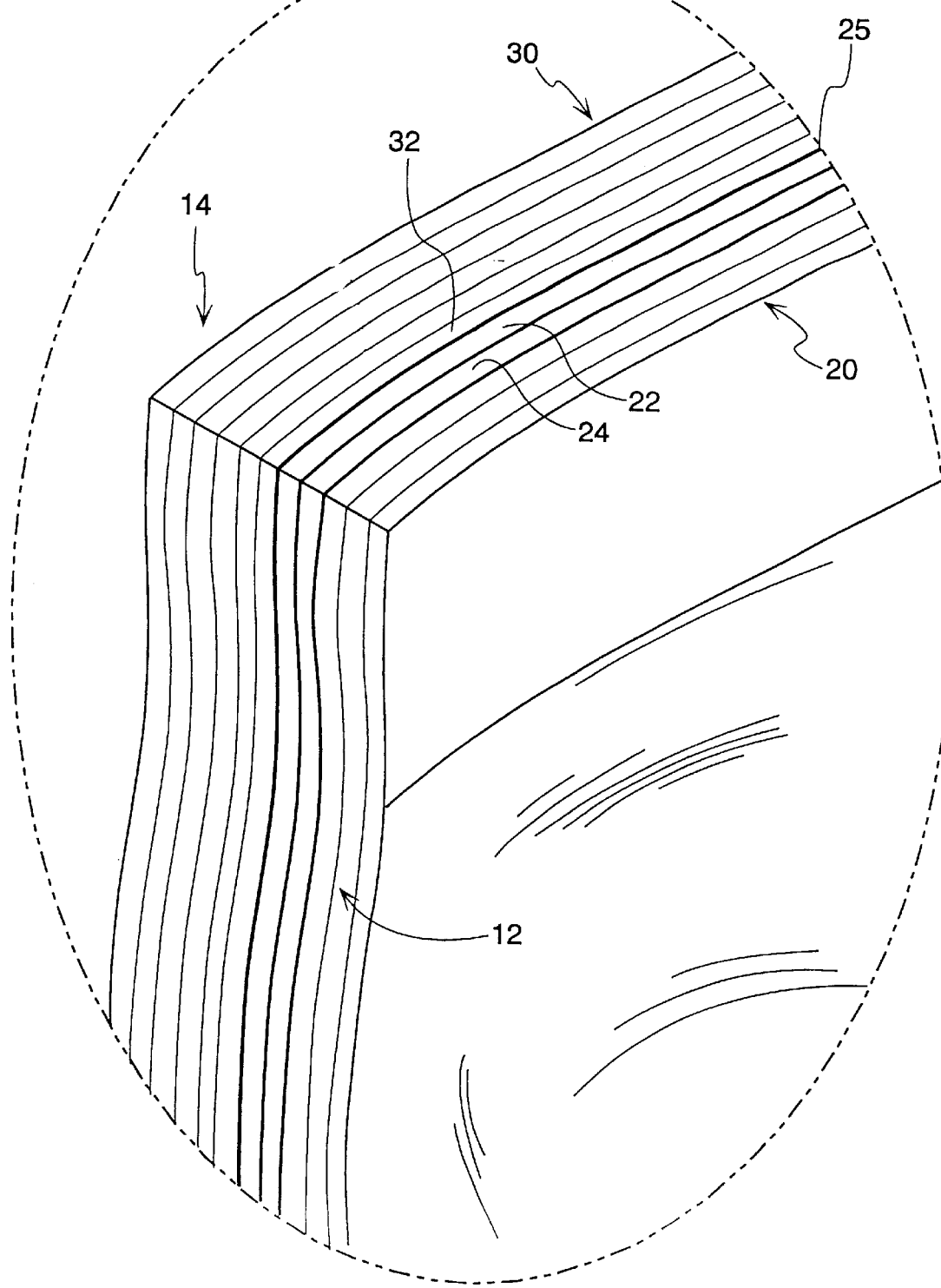
FIG. 3a is a magnified view of a portion of the package depicted in FIG. 3.

FIG. 3a is a magnified view of the area of FIG. 3 identified by the dotted circle. The bond formed between the first, external layer 22 of the first package wall 20 and the first external layer 32 of the second package wall 30 has a greater bond strength than the peelable bond between the first external layer 22 of the first package wall 20 and the second tie layer 24 of the first package wall 20 such that upon application of digital pull-apart force, the first and second package walls 20, 30 will remain bonded together and delamination will occur at the peelable bond between the first, external layer 22 and the second, tie layer 24 of the first package wall 20. It is preferable that the second package wall not include a delamination seal such that a clean delamination occurs.

Figure 4:
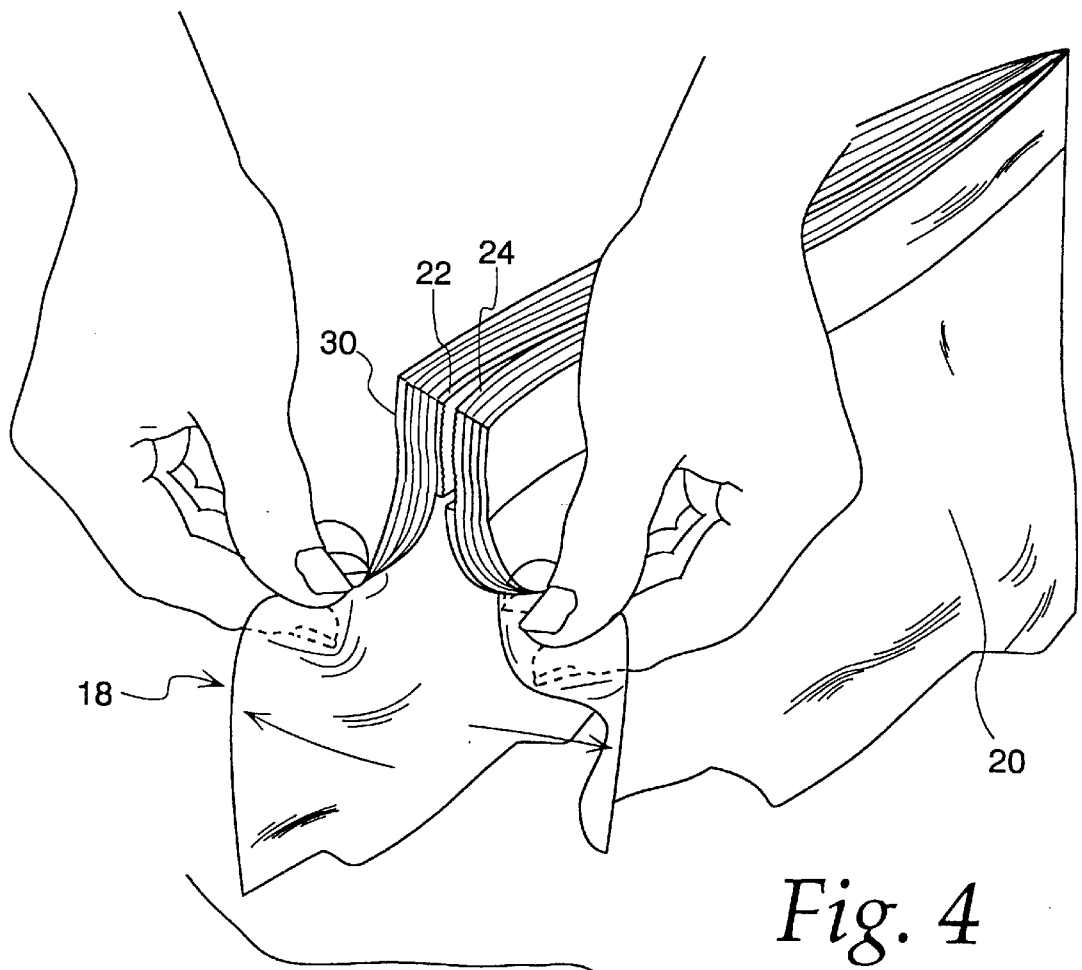
FIG. 4 is a view of the heat sealed package depicted in FIG. 3 being opened by a consumer.

FIG. 4 shows the multilayer package 18 depicted in FIG. 3 being opened by a consumer. The consumer must simply grasp the two opposing package walls 20, 30 and pull to start the delamination or peeling process. One can pull from below the heat sealed top portion of the package or, if one package wall extends above the opposing package wall, one can pull apart the delamination layers from the top portion of the package. Preferably, the uppermost portions of the first and second package walls are not heat sealed together at their uppermost perimeters, creating tabs on flanges to grab and pull apart.

As discussed, the resin combinations in the second tie layer 24 allow the film structure constituting the first package wall 20 to separate at the interface of the first external layer 22 and the second, tie layer 24 when the consumer peels apart a package which is heat sealed at the first and second package wall interface 25. When the first and second layers 22 and 24, respectively separate, the first, external layer 22 stays with the second package wall 30 to which it was heat sealed and the new surface of the original five layer film making up the first package wall 20 becomes the second, tie layer 24. A by-product of the delamination process provides a tamper-evident feature to alert the consumer if the package has been partially or completely opened prior to purchase or use of the product contained within the package by the consumer. Specifically, as the peelable layers delaminate from each other, a whitening occurs on the surface of the delaminated layers.

Provided below is a simple illustration depicting delamination:

| Package Opened and Delamination Occurs: | | | | |
| --- | --- | --- | --- | --- |
| Second Package Wall LAYER 1 | Heat ///////// ///////// Seal | EVA LAYER 2 | Delamination Occurs HERE | Peelable Tie |

Figure 5:
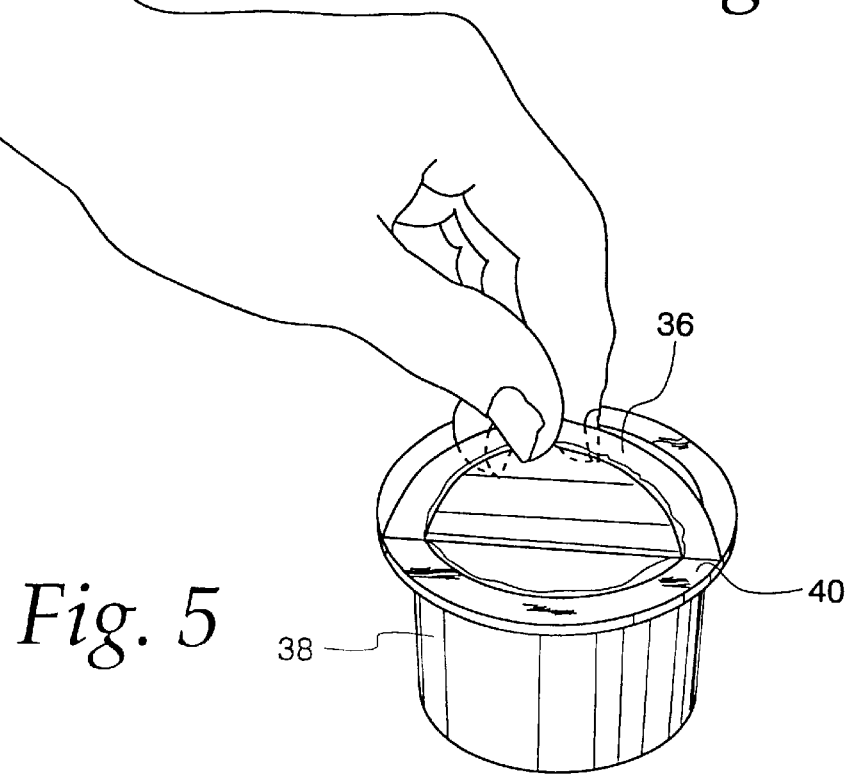
FIG. 5 is a view of a lidded cup showing delamination occurring between the peelably sealed layers.

FIG. 5 depicts an alternate embodiment of the instant invention. A multilayer film construction as shown in FIG. 1 can be incorporated into the lid 36 of a package constituting a polymeric pre-formed cup or receptacle 38. The lid 36 can be hermetically heat sealed to the exposed lip 40 of the receptacle and constitute a multilayered construction including a delamination peelable seal such that a consumer can easily open the package. The five layers (not shown in FIG. 5) of the lid 36 are of the same composition as the layers of the multilayer film shown in FIG. 1. Specifically, the film structure of the lid constitutes a first external layer 2 preferably made of an ethylene vinyl acetate (EVA) resin. Slip/antiblock additives may be added to achieve desired surface characteristics. Other suitable resins for the first, external layer 2 include an ethylene vinyl acetate copolymer, linear low density polyethylene, an ethylene ethyl acrylate copolymer, an ethylene methyl acrylate copolymer, a neutralized ethylene acid copolymer, and low density polyethylene and certain mixtures and blends of these resins. This first, external layer 2 is heat sealed to the receptacle. The second, tie layer 4 is the layer containing the resin combinations giving the layers of the lid the ability to perform as a delamination peelable seal. Specifically, the second, tie layer 4 is comprised of a combination of an anhydride modified polyethylene and polybutylene, polypropylene and/or styrene-butadiene copolymer resins. Most preferably, the anhydride modified polyethylene component of the tie layer 4 is made of a combination of Bynel® resins from E.I. DuPont De Nemours & Company, Wilmington, Del. Specifically, it is most preferable to utilize a blend of a Bynel® resin which is an anhydride modified linear low density polyethylene (LLDPE) with a Bynel® resin which an anhydride modified low density polyethylene (LDPE) and combine this blend with polybutylene. This combination of Bynel® adhesives and polybutylene allows the first, external layer 2 and the second, tie layer 4 to separate while maintaining adhesion between the second, tie layer 4 and the third oxygen barrier layer 6. The second, tie layer 4 preferably comprises between about ten to thirty-five percent polybutylene by weight and between about sixty-five to ninety percent of an anhydride modified polyethylene by weight. Most preferably, the second, tie layer 4 is made up of approximately twenty percent polybutylene by weight and about eighty percent of an anhydride modified polyethylene by weight.

The center core layer 6 contains an ethylene vinyl alcohol (EVOH) barrier resin. This layer is primarily responsible for the oxygen barrier properties of the multilayer film of the instant invention.

The fourth, tie layer 8 is comprised of an anhydride modified polyethylene such as Bynel® or a combination of Bynel resins and an ethylene vinyl acetate (EVA) resin.

The fifth, external layer 10 comprises EVA, preferably having a low vinyl acetate content. Other suitable resins for the fifth layer include ethylene vinyl acetate copolymer, linear low density polyethylene, ethylene ethyl acrylate copolymer, ethylene methyl acrylate copolymer, neutralized ethylene acid copolymer, and low density polyethylene and certain mixtures and blends of these resins. Preferably, the material making up the lip 40 of the receptacle is made of the same of similar material to the first external layer 2 of the multilayer film of the lid 36. Of course, the lip 40, and entire receptacle 38 for that matter, may also be multilayered.

As is true of all of the packages incorporating the multi-layer film 12 of the instant invention, additional layers (not shown) of polymeric or non-polymeric material such a paper or foil may be bonded to the fifth, external layer 10 of the multilayer film 12.

Multilayer films of the instant invention can be formed by any of the conventional processes for making films and multilayer films including laminations, extrusions, coextrusion, blown extrusion, tubular water quench extrusion, extrusion coating and the like. Coextrusion utilizing a tubular water quench process is presently preferred for forming the multilayer films of the instant invention. These multilayer films can be formed into usefull articles such as packages, e.g. pouches, containers, and the like by conventional processes for making such articles including blow molding, stretch blow molding, and similar processes.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A package comprising:
   a first package wall having a multilayer film construction, said multilayer film construction comprising:
   a first, external layer; a second, tie layer comprising a blend of about 65% to 90% by weight an anhydride modified polyethylene and about 10% to 35% by weight of a compound selected from the group consisting of polybutylene, polypropylene and a styrene-butadiene copolymer such that a peelable bond is formed between said first, external layer and said second, tie layer; a third, core layer comprising ethylene vinyl alcohol; a fourth, tie layer comprising an anhydride modified polyethylene and a fifth, external layer; and
   a second package wall joined at a portion of its perimeter to said first package wall; wherein said first, external layer of said first package wall is heat sealed to said second package wall to create a sealed package such that a bond is formed between said first, external layer of said first package wall and said second package wall having a greater bond strength than said peelable bond such that upon application of digital pull-apart force said first and second package walls will remain bonded together and delamination will occur at said peelable bond between said first, external layer and said second, tie layer of said first package wall wherein said package is opened by the use of digital force.

2. The package of claim 1, wherein said first, external layer of said first package wall is selected from the group consisting of ethylene vinyl acetate copolymer, linear low density polyethylene, ethylene ethyl acrylate copolymer, ethylene methyl acrylate copolymer, neutralized ethylene acid copolymer and low density polyethylene.

3. The package of claim 1, wherein said fifth, external layer of said first package wall is selected from the group consisting of ethylene vinyl acetate copolymer, linear low density polyethylene, ethylene ethyl acrylate copolymer, ethylene methyl acrylate copolymer, neutralized ethylene acid copolymer and low density polyethylene.

4. The package of claim 1, wherein said fourth layer further includes an ethylene vinyl acetate copolymer.

5. The package of claim 1, wherein said second package wall comprises a polymer which is heat seal compatible to said first external layer of said first package wall.

6. The package of claim 5, wherein said second package wall comprises the same polymer as said first external layer of said first package wall.

7. The package of claim 1, wherein said second package wall has a multilayer film construction such that a first external layer of said second package wall comprises a polymer which is heat seal compatible to said first external layer of said first package wall.

8. The package of claim 7, wherein said first external layer of said second package wall comprises the same polymer as said first external layer of said first package wall.

9. The package of claim 1, wherein said second, tie layer comprises about 20 percent polybutylene by weight and about eighty percent of an anhydride modified polyethylene by weight.

10. The package of claim 1, further including an additional film layer or layers adjacent said fifth, external layer of said first package wall.

11. A package comprising:
    a first package wall having a multilayer film construction, said multilayer film construction comprising: a first, external layer comprising an ethylene vinyl acetate copolymer; a second, tie layer comprising a blend of about 65% to 90% by weight an anhydride modified polyethylene and about 10% to 35% by weight of a compound selected from the group consisting of polybutylene, polypropylene and a styrene-butadiene copolymer such that a peelable bond is formed between said first, external layer and said second, tie layer; a third, core layer comprising ethylene vinyl alcohol; a fourth, tie layer comprising an anhydride modified polyethylene and a fifth, external layer comprising an ethylene vinyl acetate copolymer; and
    a second package wall joined at a portion of its perimeter to said first package wall; wherein said first, external layer of said first package wall is heat sealed to said second package wall to create a sealed package such that a bond is formed between said first, external layer of said first package wall and said second package wall having a greater bond strength than said peelable bond such that upon application of digital pull-apart force said first and second package walls will remain bonded together and delamination will occur at said peelable bond between said first, external layer and said second, tie layer of said first package wall wherein said package can be opened by digital force.

12. The package of claim 11, wherein said second package wall comprises a polymer which is heat seal compatible to said first external layer of said first package wall.

13. The package of claim 12, wherein said second package wall comprises the same polymer as said first external layer of said first package wall.

14. The package of claim 12, wherein said second package wall comprises a multilayer film construction, such that a first external layer of said second package wall comprises a polymer which is heat seal compatible to said first external layer of said first package wall.

15. The package of claim 14, wherein said first external layer of said second package wall comprises the same polymer as said first external layer of said first package wall.

16. The package of claim 11, wherein said second, tie layer comprises between about ten to thirty-five percent polybutylene by weight and between about sixty-five to ninety percent of an anhydride modified polyethylene by weight.

17. The package of claim 11, wherein said second, tie layer comprises about twenty percent polybutylene by weight and about eighty percent of an anhydride modified polyethylene by weight.

18. The package of claim 11, further including an additional film layer or layers adjacent said fifth, external layer of said first package wall.

19. A multilayer film construction comprising:
a first, external layer;
a second, tie layer comprising a blend of about 65% to 90% by weight of an anhydride modified polyethylene and about 10% to 35% by weight of a compound selected from the group consisting of polybutylene, polypropylene and a styrene-butadiene copolymer such that a peelable bond is formed between said first, external layer and said second, tie layer;
a third, core layer comprising ethylene vinyl alcohol;
a fourth, tie layer comprising an anhydride modified polyethylene; and
a fifth, external layer.

20. The multilayer film construction of claim 19, wherein said first, external layer is selected from the group consisting of ethylene vinyl acetate copolymer, linear low density polyethylene, ethylene ethyl acrylate copolymer, ethylene methyl acrylate copolymer, neutralized ethylene acid copolymer and low density polyethylene.

21. The multilayer film construction of claim 19, wherein, said fifth, external layer is selected from the group consisting of ethylene vinyl acetate copolymer, linear low density polyethylene, ethylene ethyl acrylate copolymer, ethylene methyl acrylate copolymer, neutralized ethylene acid copolymer and low density polyethylene.

22. The multilayer film construction of claim 19, wherein said fourth, tie layer further includes an ethylene vinyl acetate copolymer.

23. The multilayer film construction of claim 19, wherein said second, tie layer comprises between about ten to thirty-five percent polybutylene by weight and between about sixty-five to ninety percent of an anhydride modified polyethylene by weight.

24. The multilayer film construction of claim 19, wherein said second tie layer comprises about twenty percent polybutylene by weight and about eighty percent of an anhydride modified polyethylene by weight.

25. The multilayer film construction of claim 19, further including an additional film layer or layers adjacent said fifth, external layer.

26. A multilayer film construction comprising:
a first, external layer comprising an ethylene vinyl acetate copolymer;
a second, tie layer comprising a blend of about 65% to 90% by weight of an anhydride modified polyethylene and about 10% to 35% by weight of a compound selected from the group consisting of polybutylene, polypropylene and a styrene butadiene copolymer such that a peelable bond is formed between said first external layer and said second tie layer;
a third, core layer comprising ethylene vinyl alcohol;
a fourth, tie layer comprising an anhydride modified polyethylene; and
a fifth, external layer comprising an ethylene vinyl acetate copolymer.

27. The multilayer film construction of claim 26, wherein said second, tie layer comprises between about ten to thirty-five percent polybutylene by weight and between about sixty-five to ninety percent of an anhydride modified polyethylene by weight.

28. The multilayer film construction of claim 26, wherein said second tie layer comprises about twenty percent polybutylene by weight and about eighty percent an anhydride modified polyethylene by weight.

29. The multilayer film construction of claim 26, further including an additional film layer or layers adjacent said fifth, external layer.

* * * * *